United States Patent
Hartl et al.

(10) Patent No.: US 9,423,218 B2
(45) Date of Patent: Aug. 23, 2016

(54) METHOD FOR PRODUCING A RING-SHAPED OR PLATE-LIKE ELEMENT

(75) Inventors: Helmut Hartl, Österreich (AT); Thomas Pfeiffer, Kumhausen (DE)

(73) Assignee: Schott AG, Mainz (DE)

( * ) Notice: Subject to any disclaimer, the term of this patent is extended or adjusted under 35 U.S.C. 154(b) by 1023 days.

(21) Appl. No.: 13/234,687

(22) Filed: Sep. 16, 2011

(65) Prior Publication Data

US 2012/0067099 A1 Mar. 22, 2012

(30) Foreign Application Priority Data

Sep. 17, 2010 (DE) .......................... 10 2010 045 641

(51) Int. Cl.
*B23P 15/00* (2006.01)
*F42B 3/103* (2006.01)
*B21J 1/02* (2006.01)
*B21K 21/08* (2006.01)
*B60R 21/26* (2011.01)

(52) U.S. Cl.
CPC ................ *F42B 3/103* (2013.01); *B21J 1/025* (2013.01); *B21K 21/08* (2013.01); *B23P 15/00* (2013.01); *B60R 2021/26029* (2013.01); *Y10T 29/49908* (2015.01)

(58) Field of Classification Search
CPC ....... B23P 15/00; B21K 21/00; B21K 21/08; B21K 1/761; B21K 21/02; B21D 53/24; B21D 53/16; B21D 53/20; B21D 51/10
USPC ......... 29/417, 557, 558; 72/324, 367.1, 368, 72/370.1, 333, 334, 335, 341, 352, 356, 72/358; 102/202.5, 202.9, 202.14, 202.7
See application file for complete search history.

(56) References Cited

U.S. PATENT DOCUMENTS

| | | |
|---|---|---|
| 1,325,194 A | 12/1919 | Geist |
| 1,584,998 A | 5/1926 | Symons et al. |
| 1,813,906 A | 7/1931 | Caron |
| 1,990,718 A * | 2/1935 | Swanstrom ...................... 470/19 |
| 3,134,329 A | 5/1964 | Zeman |
| 3,274,937 A | 9/1966 | Kyle |

(Continued)

FOREIGN PATENT DOCUMENTS

| | | |
|---|---|---|
| CA | 2 459 262 A1 | 9/2004 |
| CN | 2808662 Y | 8/2006 |

(Continued)

OTHER PUBLICATIONS

Communication dated Aug. 6, 2010 from European Patent Office for EP 10 002 0451-1260, including European Search Report dated Jul. 30, 2010 and opinion (7 pages).

(Continued)

*Primary Examiner* — Christopher M Koehler
(74) *Attorney, Agent, or Firm* — Taylor IP, P.C.

(57) ABSTRACT

The invention relates to a method for producing a ring-shaped or plate-like element, in particular for a metal-sealing material-feedthrough, in particular for devices which are subjected to high pressures, preferably igniters for airbags or belt tensioning devices, whereby a blank, especially in the embodiment of a wire-shaped material is provided and the blank is subjected to processing so that a feedthrough-opening can be incorporated into a ring-shaped or plate-like element created from the blank.

12 Claims, 5 Drawing Sheets

(56) References Cited

U.S. PATENT DOCUMENTS

| | | | |
|---|---|---|---|
| 3,635,067 A | 1/1972 | Hanas | |
| 3,735,664 A | 5/1973 | Hermle | |
| 3,735,705 A | 5/1973 | Hudson, Jr. et al. | |
| 3,854,827 A | 12/1974 | Merz et al. | |
| 3,901,772 A | 8/1975 | Guillotin et al. | |
| 3,971,320 A | 7/1976 | Lee | |
| 4,048,835 A | 9/1977 | Giger | |
| 4,453,033 A | 6/1984 | Duff et al. | |
| 4,566,892 A | 1/1986 | Ertel | |
| 4,577,646 A | 3/1986 | Ziehn | |
| 4,580,431 A * | 4/1986 | Oku | B21K 1/30 72/334 |
| 4,686,903 A | 8/1987 | Wittwer | |
| 4,800,745 A | 1/1989 | Yokoyama | |
| 5,016,461 A | 5/1991 | Walker et al. | |
| 5,140,906 A | 8/1992 | Little, II | |
| 5,157,831 A | 10/1992 | Wang et al. | |
| 5,243,492 A * | 9/1993 | Marquit et al. | 361/247 |
| 5,321,307 A | 6/1994 | Murai | |
| 5,345,872 A | 9/1994 | Takahashi et al. | |
| 5,367,125 A | 11/1994 | Viret et al. | |
| 5,404,263 A | 4/1995 | Graves et al. | |
| 5,538,527 A | 7/1996 | Viret et al. | |
| 5,557,074 A | 9/1996 | Miyamoto et al. | |
| 5,618,237 A * | 4/1997 | Shinjo | B21D 53/24 470/91 |
| 5,621,183 A | 4/1997 | Bailey | |
| 5,672,841 A | 9/1997 | Monk et al. | |
| 5,709,724 A * | 1/1998 | Naugler et al. | 65/59.4 |
| 5,732,634 A | 3/1998 | Flickinger et al. | |
| 5,894,752 A * | 4/1999 | Yano | B21C 23/18 72/355.2 |
| 5,932,832 A | 8/1999 | Hansen et al. | |
| 5,943,897 A | 8/1999 | Tsue et al. | |
| 5,988,069 A | 11/1999 | Bailey | |
| 6,026,721 A | 2/2000 | Fukai | |
| 6,274,252 B1 * | 8/2001 | Naugler et al. | 428/621 |
| D460,684 S | 7/2002 | Liao | |
| 6,557,474 B1 | 5/2003 | Morte et al. | |
| 6,612,241 B2 | 9/2003 | Avetisian | |
| 6,755,670 B2 | 6/2004 | Korber | |
| 6,874,422 B2 | 4/2005 | Heeke | |
| 6,877,431 B2 | 4/2005 | Heeke | |
| 6,936,303 B1 | 8/2005 | Katsuda et al. | |
| D528,407 S | 9/2006 | Schwab | |
| 7,124,688 B2 | 10/2006 | Avetisian et al. | |
| 7,267,056 B2 | 9/2007 | Takahara et al. | |
| 7,770,520 B2 | 8/2010 | Fink et al. | |
| 7,823,289 B2 * | 11/2010 | Willers et al. | 29/890.128 |
| 7,975,611 B2 | 7/2011 | Bjoern | |
| 8,127,681 B2 | 3/2012 | Fink | |
| 2002/0024092 A1 | 2/2002 | Palm et al. | |
| 2002/0069781 A1 | 6/2002 | Avetisian et al. | |
| 2002/0069783 A1 | 6/2002 | Avetisian et al. | |
| 2002/0081899 A1 | 6/2002 | Korber | |
| 2002/0174792 A1 | 11/2002 | Kubozuka et al. | |
| 2003/0087705 A1 * | 5/2003 | Matsuyama | B21K 21/08 470/26 |
| 2003/0177936 A1 | 9/2003 | Luebbers | |
| 2003/0192446 A1 | 10/2003 | Berg et al. | |
| 2003/0196468 A1 * | 10/2003 | Ando | B21K 21/08 72/353.2 |
| 2004/0020052 A1 * | 2/2004 | Haga | B21K 1/00 29/898.054 |
| 2004/0079545 A1 | 4/2004 | Heeke | |
| 2004/0216631 A1 * | 11/2004 | Fink | F42B 3/103 102/200 |
| 2004/0250542 A1 | 12/2004 | Nishina | |
| 2005/0051435 A1 | 3/2005 | Forster et al. | |
| 2005/0126415 A1 | 6/2005 | Takahara et al. | |
| 2005/0166381 A1 * | 8/2005 | Babej et al. | 29/417 |
| 2006/0053612 A1 * | 3/2006 | Babej et al. | 29/412 |
| 2006/0207469 A1 | 9/2006 | Fink et al. | |
| 2006/0222881 A1 | 10/2006 | Fink et al. | |
| 2007/0187934 A1 | 8/2007 | Fink | |
| 2008/0245545 A1 | 10/2008 | Bjorn | |
| 2008/0250963 A1 * | 10/2008 | Fink | F42B 3/103 102/202.8 |
| 2009/0044715 A1 | 2/2009 | Hartl et al. | |
| 2009/0158953 A1 | 6/2009 | Magne et al. | |
| 2009/0282952 A1 * | 11/2009 | Yen | B21K 5/00 81/124.6 |
| 2010/0199872 A1 | 8/2010 | Fink et al. | |
| 2010/0229616 A1 * | 9/2010 | Fink | F42B 3/198 72/338 |
| 2012/0067099 A1 | 3/2012 | Hartl et al. | |
| 2012/0199036 A1 | 8/2012 | Fink | |

FOREIGN PATENT DOCUMENTS

| | | |
|---|---|---|
| CN | 101417379 A | 4/2009 |
| CN | 100393555 C | 6/2011 |
| DE | 2904174 A1 | 8/1980 |
| DE | 29 16 037 A1 | 11/1980 |
| DE | 34 14 625 | 10/1984 |
| DE | 34 15 625 A1 | 10/1985 |
| DE | 198 35 478 A1 | 2/2000 |
| DE | 199 27 233 | 1/2001 |
| DE | 101 33 223 | 10/2002 |
| DE | 103 48 944 | 5/2004 |
| DE | 203 14 580 | 9/2004 |
| DE | 203 14 580 U1 | 9/2004 |
| DE | 103 26 253 B3 | 11/2004 |
| DE | 10 2005 009 644 A1 | 9/2006 |
| DE | 10 2006 004 036 A1 | 8/2007 |
| DE | 10 2007 016 692 B3 | 7/2008 |
| DE | 10 2010 045 641 A1 | 3/2012 |
| EP | 0 064 263 A2 | 4/1982 |
| EP | 0 137 488 A2 | 4/1985 |
| EP | 0 064 263 B1 | 7/1986 |
| EP | 0 248 977 A1 | 12/1987 |
| EP | 0 248 977 B1 | 1/1992 |
| EP | 0 610 925 A1 | 8/1994 |
| EP | 1 061 325 A1 | 12/2000 |
| EP | 1 130 697 A2 | 9/2001 |
| EP | 1 225 415 | 7/2002 |
| EP | 1 061 325 B1 | 1/2003 |
| EP | 1 455 160 A1 | 9/2004 |
| EP | 1455160 A1 | 9/2004 |
| EP | 1 491 848 | 12/2004 |
| EP | 1 808 667 A2 | 7/2007 |
| EP | 1 813 906 A1 | 8/2007 |
| EP | 1 455 160 B1 | 5/2008 |
| EP | 2 151 289 A1 | 2/2010 |
| EP | 2 187 162 A2 | 5/2010 |
| EP | 2 251 633 A2 | 11/2010 |
| EP | 2 270 417 A2 | 1/2011 |
| EP | 1 813 906 B1 | 4/2011 |
| JP | 60-105829 A | 6/1985 |
| JP | 3-5753 U | 1/1991 |
| JP | 5-256596 A | 10/1993 |
| JP | 3058511 U | 3/1999 |
| JP | 2000-500856 A | 1/2000 |
| JP | 2000-111297 A | 4/2000 |
| JP | 2001-518439 A | 10/2001 |
| JP | 2003-285712 A | 10/2003 |
| WO | 99/16721 A1 | 4/1999 |
| WO | 03/083404 A1 | 10/2003 |
| WO | 2007/054530 A1 | 5/2007 |

OTHER PUBLICATIONS

Communication dated Jun. 1, 2011 from European Patent Office for EP 10 002 045.2-1260 (4 pages).

Communication dated Oct. 17, 2011 from European Patent Office for EP 10 009 062.0-1260, including European Search Report dated Oct. 6, 2011 and opinion (8 pages).

Communication dated Oct. 17, 2011 from European Patent Office for EP 10 009 095.0-1260, including European Search Report dated Oct. 7, 2011 and opinion (8 pages).

Opposition documents Dated Feb. 3, 2009 filed in European Patent Office in EP 1 455 160 B1, including documents E5-E13 (52 pages).

(56) References Cited

OTHER PUBLICATIONS

Communication dated Jun. 11, 2004 from European Patent Office for EP 04002670.0-1260, including European Search Report dated May 21, 2004 (4 pages).
Communication dated Jun. 8, 2005 from European Patent Office for EP 04002670.0-1260 (10 pages).
Communication dated Jul. 24, 2009 submitted in EP 04002670.0, including document E14 (10 pages).
Communication dated Oct. 28, 2009 submitted in EP 04002670.0, including documents E6.1-E7.1 (12 pages).
Communication dated Oct. 12, 2010 from European Patent Office in EP 04002670.0 (3 pages).
Document dated Jan. 26, 2009 and signed by Sabine Sibera (4 pages).
Communication dated Jan. 21, 2011 submitted in EP 04002670.0, including documents E14-E25 (33 pages).
Communication dated Oct. 7, 2011 from European Patent Office in EP 04002670.0 (2 pages).
Communication dated Mar. 2, 2011 from European Patent Office in EP 04002670.0 (1 page).
Transcript in opposition in EP 04002670.0 (EP 1455160)(41 pages).
Documents filed Jun. 30, 2011 in European Patent Office in EP 04 002 670.0-1260 (28 pages).
Declaration of Mr. Thomas Fink dated May 9, 2011 submitted in U.S. Appl. No. 12/098,616 (2 pages).
Declaration of Mr. Thomas Fink dated Sep. 19, 2011 submitted in U.S. Appl. No. 12/788,624 (4 pages).
Declaration of Mr. Thomas Fink dated May 2, 2011 submitted in U.S. Appl. No. 12/098,616 (4 pages).
Declaration of Dr. Michael Sawodny dated Feb. 28, 2011 in U.S. Appl. No. 11/627,173, with Appendixes A-F (88 pages).
Declaration of Dr. Michael Sawodny dated Mar. 21, 2011 in U.S. Appl. No. 11/627,173, with Corrected Appendix E (9 pages).
Declaration of Mr. Thomas Fink dated Feb. 28, 2011 in U.S. Appl. No. 11/627,173, with Appendixes A-B (7 pages).
Documents filed in appeal in European Patent Office on Oct. 25, 2011 for EP 1 455 160 (Application No. EP 04002670.0)(166 pages).
Documents filed in opposition in European Patent Office on Jan. 19, 2012 (appears to have filed only in part on Jan. 18, 2012) for European Patent No. EP 1 813 906 (168 pages).
Communication from Japanese Patent Office (dated Jan. 16, 2012) in Japanese Patent Application No. 2009-270630 (3 pages).
Communication dated Oct. 17, 2011 from European Patent Office for European Patent Application No. EP 10 00 9062, including European Search Report (dated Oct. 6, 2011) and Written Opinion (8 pages).
Communication dated May 21, 2007 from European Patent Office including European Search Report (dated May 10, 2007) and European Search Opinion for European patent application No. EP 06 021 694.2 (7 pages).
Communication dated Aug. 12, 2009 from European Patent Office for European patent application No. EP 06 021 694.2 (5 pages).
Communication dated Dec. 1, 2010 from European Patent Office for European patent application No. EP 06 021 694.2 (8 pages).
Communication dated Dec. 17, 2010 from European Patent Office for European patent application No. EP 06 021 694.2 (50 pages).
Letter dated Mar. 4, 2011 from Dr. Michael Sawodny to European Patent Office, including corrected English translation of claims, for European patent application No. EP 06 021 694.2 (8 pages).
EP 2 187 162 A3 including European Search Report dated Jul. 30, 2010 for European Patent Application No. EP 10 00 2045 (4 pages).
Communication dated Jul. 28, 2010 from European Patent Office for European patent application No. EP 06 021 694.2 (5 pages).
Communications dated Oct. 18, 2010 and Oct. 29, 2010 from European Patent Office for European patent application No. EP 06 021 694.2 (2 pages).
Gestaltungsregein für Stanzteile aus Stahl; DIN 6932; Jan. 1983; pp. 61-65 (5 pages).
Begriffe der Stanztechnik Fertigungsverfahren und Werkzeuge zum Zerteilen; DIN 9870; Oct. 1972; pp. 306-307 and 300-302 (6 pages).
Chinese Search Report dated Jan. 6, 2015 for Chinese Application No. 201110285207.4 (3 pages).
Datasheet "Stainless Austenitic Chromium-Nickel Steel with Copper Addition", Deutsche Edelstahlwerke (2 pages).
Extract from the book "Upsetting and Pressing" of Heinz-Dietrich Feldmann and Joseph Billigmann, Hanser Verlag, 2nd Edition (12 pages).
Extract from the book "Extruding—Economical Production of Metallic Precision Workpieces" by K. Lange, M. Kammerer, K. and J. Pöhlandt Schöck, Springer Verlag (12 pages).

\* cited by examiner

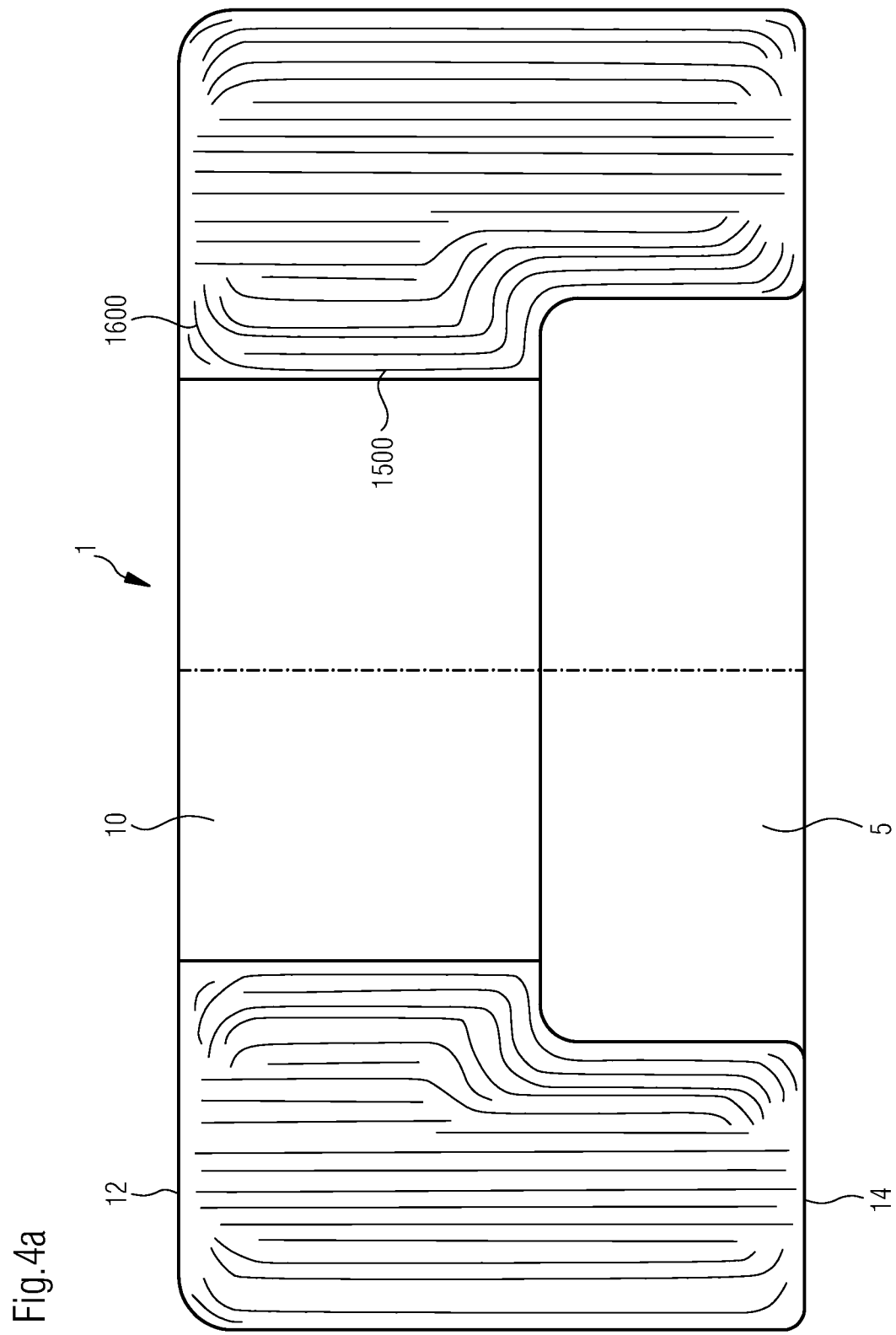

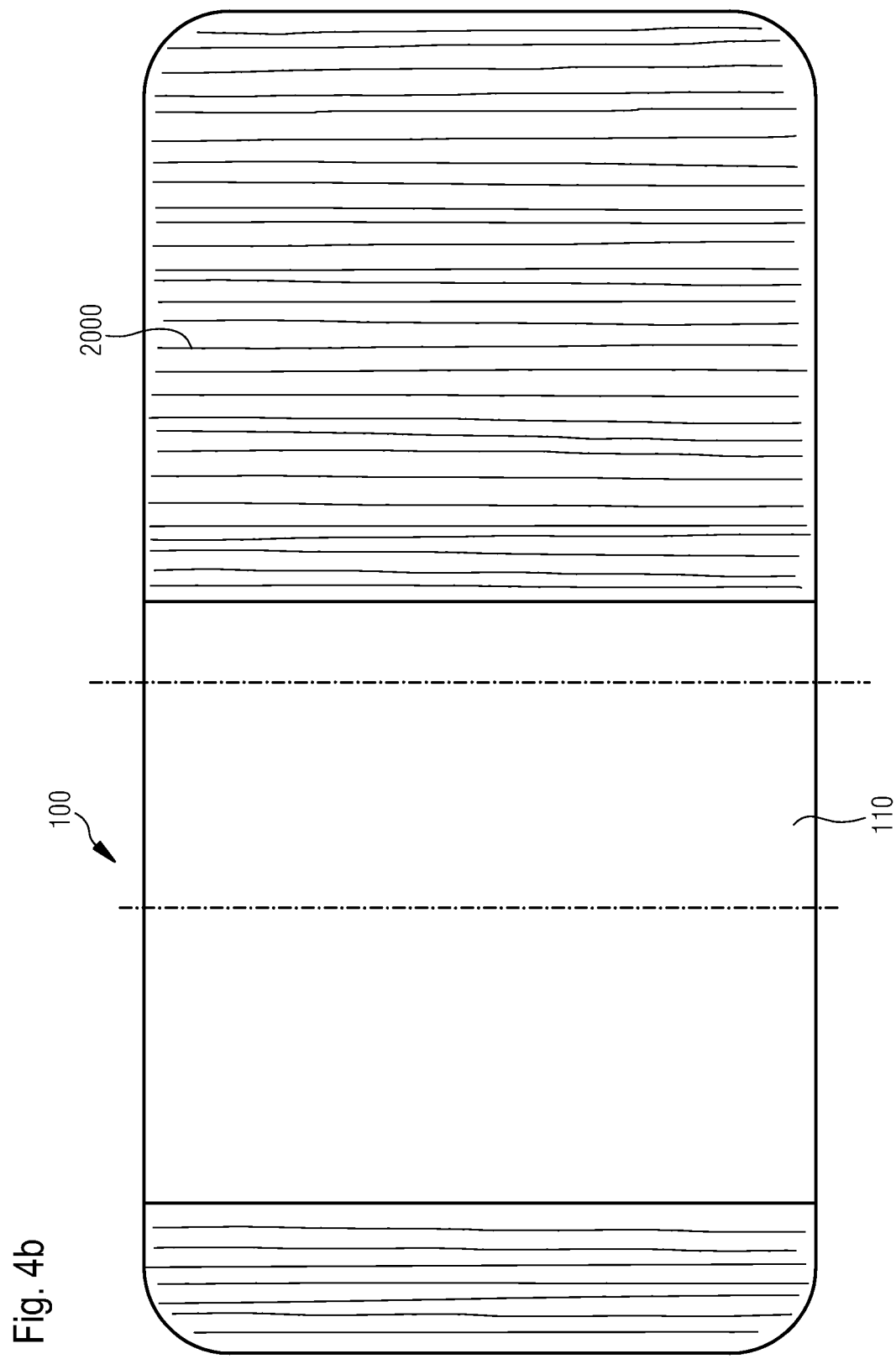

METHOD FOR PRODUCING A RING-SHAPED OR PLATE-LIKE ELEMENT

BACKGROUND OF THE INVENTION

1. Field of the Invention

The invention relates to a method for producing a ring-shaped or plate-like element, in particular for a metal-sealing material-feedthrough, in particular for devices which are subjected to high pressures, preferably igniters for airbags or belt tensioning devices, as well as a method to produce a metal-sealing material-feedthrough.

2. Description of the Related Art

Metal-sealing material-feedthroughs are already known in various forms from the current state of the art. Metal-sealing material-feedthroughs are to be understood to be vacuum-tight fusions of sealing materials, especially glasses, glass ceramics or synthetics in metals. The metals function hereby as conductors. We refer you in this context to representative documentation U.S. Pat. Nos. 5,345,872, 3,274,937. Feedthroughs of this type are common in electronic and electrical engineering. The material used for sealing, especially glass serves as an insulator. Typical metal-sealing material-feedthroughs are constructed such that metallic internal conductors are sealed into a pre-formed sintered glass component, whereby the sintered glass component or the glass tube is sealed into an outer metal component with the so-called base body which is formed by a ring-shaped or plate-like element. Preferred applications for metal-sealing material-feedthroughs of this type are for example ignition devices. One area of application is in air bags or belt tensioning devices in motor vehicles. In this case the metal-sealing material-feedthroughs are a component part of an ignition device. The entire ignition device includes in addition to the metal-sealing material-feedthrough an ignition bridge, the explosive agent as well as a metal shrouding which tightly encloses the ignition mechanism. Either one or two, or more than two metal pins may be inserted through the feedthrough. In a preferred embodiment with one metallic pin the housing is grounded; in a preferred two-pin embodiment one of the pins is grounded.

Metal-sealing material-feedthroughs, especially for igniters for airbags or belt tensioning devices which distinguish themselves in that the feedthrough opening for the metal pins is punched out of the base body have become known from US 2006/0222881 A1, US 2004/0216631, EP-A-1 455 160, US 2007/0187934 A1 and U.S. Pat No. 1,813,906. During the production of the base bodies from a strip stock having a thickness in the range of between 1 mm and 5 mm, preferably 1.5 mm and 3.5 mm, especially between 1.8 mm to 3.0 mm, more especially preferably between 2.0 mm to 2.6 mm the openings are punched through the entire thickness of base body D by means of a punching process, according to US 2007/0187934.

The metal pin in the sealing material is embedded into the opening punched into the base body across the entire thickness D of the base body which is in the aforementioned range.

Moreover, the feedthrough-opening in feedthroughs with more than one pin is arranged off-center according to US 2007/0187934 A1.

According to US 2007/0187934 A1 punching sheet metal has a multitude of disadvantages. One disadvantage is that when punching a solid material, for example sheet metal of the base body, a great amount of material waste occurs.

Especially in metal-sealing material-feedthroughs with two metal pins and an off-center opening the problem arose that the off-center opening resulted in a weakening of the glazing.

It is therefore the objective of the current invention, and what is needed in the art is, to avoid the described disadvantages according to the current state of the art and to cite a method in particular for the production of a base body in the form of a ring-shaped or plate-like element for a metal-sealing material-feedthrough which can be produced with lesser material waste than is the case in the current state of the art, in particular in a cold forming process.

SUMMARY OF THE INVENTION

According to the current invention the objective is met by, and the present invention provides, a method for the production of a plate-like element which represents the base body, in particular for a metal-sealing material-feedthrough, whereby a blank, especially a wire-shaped material, is provided and the blank is subjected to processing so that a feedthrough-opening can be incorporated into a ring-shaped or plate-like element created from the blank.

The processing of the blank most preferably includes incorporation of a relief region and reshaping, especially cold-forming. The process steps of the method can be carried out in varying sequence.

One possible sequence without limitation thereto includes the following process steps:

A blank, in particular of a wire-shaped material, is provided.

The blank is cold-formed, in particular by means of compressing, whereby the relatively geometric dimensions are changed, resulting in the plate-like element with an essentially round outside contour.

A relief region is incorporated into the plate-like element.

After incorporation of the relief region in the plate-like element—which results in that the plate-like element has a lesser thickness in the region of the through-opening than the thickness of the plate-like element, especially the base body—the through-opening is produced in the region of reduced thickness with the assistance of a punching process.

In a first preferred embodiment of the method a relief region may be incorporated into the blank or the ring- or plate like element, or respectively the base body in that the blank or the ring- or plate like element is pressed against a punch. Due to the pressure of the punch the material of the blank or the ring-shaped or plate-like element which is preferably steel with a copper component of 1 to 5 weight-% copper surrounds around the punch. In this manner a relief bore or respectively a relief region can be incorporated into the blank or the ring-shaped or plate-like element by means of the punch. Alternatively it is possible not to press the blank or the ring-shaped or plate-like element against a punch, but instead press a punch against one side of the blank or the ring-shaped or plate-like element. Due to the pressure this results in that the material of the plate-like body is pushed out on the side opposite the side on which the pressure is exerted. The result of this process is again the production of a relief region, or respectively the relief bore.

After providing the relief region a punching tool is provided in the area of the relief region or respectively the relief bore and the feedthrough-opening is produced by means of punching. The thickness of the ring-shaped or plate-like element is preferably reduced in the region of the through-opening which is to be punched, preferably to values from 1.5 mm to 4.5 mm.

It is preferred if a conically tapering opening is punched out with the assistance of the punching tool.

The advantage of the illustrated method is that the production of the ring-shaped or plate-like element which finds use in a metal-sealing material-feedthrough occurs essentially at the same time interval in all different process steps. This means that the step of cold-forming, the step of incorporating the relief opening or respectively the relief region, as well as the step of punching the through-opening into the ring-shaped or plate-like element requires essentially the same amount of time. In this manner it is possible—starting with a wire like material—to produce a ring-shaped or plate-like element with a through-opening essentially at the same pace at different work stations, that is the work station for cold forming, the work station for producing the relief opening and the work station for punching. If it is necessary, like for example in the current state of the art to produce the bore in a machined or cold formed ring-shaped or plate-like element not by means of a punching process but by means of a drilling process, then the drilling process requires a much longer time than cold forming. Thus, the production of a ring-shaped or plate-like element requires at least double the time, compared to the inventive method.

As stated previously it is preferred, if the plate-like element consists of steel, preferably high grade steel with a copper content in the range of 1 weight % to 5 weight %, especially between 2.0 weight % to 4 weight %. A material of this type allows for the ring-shaped or plate-like element, or respectively the base body to be produced through cold forming, for example from a wire material. Hereby a piece is initially cut off the steel wire with the above stated copper content. In an additional step it is brought into the desired shape by means of compression into the form of the plate-like element. This is only possible if the material possesses a certain elasticity which is achieved through the stated copper content. The material is heavily compressed or respectively compacted through the described cold forming.

However, the material does not have to be formable only through cold forming, but in applications for example for airbag igniters it must also possess sufficient rigidity in order to absorb ejection forces of 1750 N to 3000 N which act upon the sealing material without deformation when using in an igniter. In addition the material must also guarantee reliable laser welding.

Surprisingly it has been found that a steel, in particular a high grade steel with a copper content of 1 weight % to 5 weight % combines these two conflicting characteristics, namely on the one hand the sufficient elasticity for cold-forming and on the other hand sufficient rigidity, or respectively flexural strength in order to withstand the high extraction forces or respectively the high ejection force under load, as can occur in a metal-sealing material-feedthrough in an igniter.

The previously described ejection force which is characteristic for metal-sealing material-feedthroughs is that force which must be applied in order to eject the sealing material which is placed in the opening of the metal sealing material feedthrough. The level of the ejection force may be determined either hydrostatically or mechanically. If the ejection force is determined mechanically then the surface of the sealing material is acted upon with a punch whereby the surface of the punch which presses upon the sealing material is smaller than the surface of the sealing material.

Alternatively, the ejection force may be measured hydrostatically. In this case the sealing material is acted upon with a hydrostatic pressure, for example water pressure and is then measured, whereby the sealing material is expelled from the feedthrough opening by said hydrostatic pressure.

In addition to the inventive method for the production of a ring-shaped or plate-like element, the invention also provides a method to produce a metal-sealing material-feedthrough with such a ring-shaped or plate-like element being the base body, whereby the metal pin of the metal-sealing material-feedthrough is glazed into the feedthrough opening of the ring-shaped or plate-like element with the assistance of the sealing material.

First, the ring-shaped or plate-like element is produced with the inventive method. Subsequently, a metal pin is fused into a sealing material which may for example be a glass plug. Then, the glass plug is placed together with the metal pin into the feedthrough opening. Glass and metal ring, in this case the ring-shaped or plate-like element are heated, so that after cooling the metal shrinks onto the sealing material—in this case the glass plug.

A preferred method for the production of a metal-sealing material-feedthrough is cited whereby two metal pins are provided. Since, according to the invention, the feedthrough opening in the plate-like element is located essentially in the center, both metal pins are curved. While one of the metal pins is passed through the feedthrough opening insulated in the glass plug, the other metal pin is preferably in the embodiment of a grounded pin and is conductively connected with the base body, for example through brazing.

The inventively produced metal-sealing material-feedthrough is advantageously applied in ignition devices of any desired design. For example, an ignition device of this type can be provided for a pyrotechnic protective device, especially for an airbag or a belt tensioning device. A pyrotechnic protective device of this type includes a metal-sealing material-feedthrough produced in accordance with the current invention, as well as a cap connected with the base body of said metal-sealing material-feedthrough, whereby a propellant is encased between the metal-sealing material-feedthrough and the cap. The ignition device with the inventive metal-sealing material-feedthrough can be utilized in gas generators, for example in hot gas generators, cold gas generators, hybrid generators.

As stated above, preferred areas of application are devices for pyrotechnic protective systems, for example airbags and belt tensioners.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIGS. 4a-4b show a comparison of the phase lines in a metallurgical section of a ring-shaped or a plate-like body according to the current state of the art.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1A:
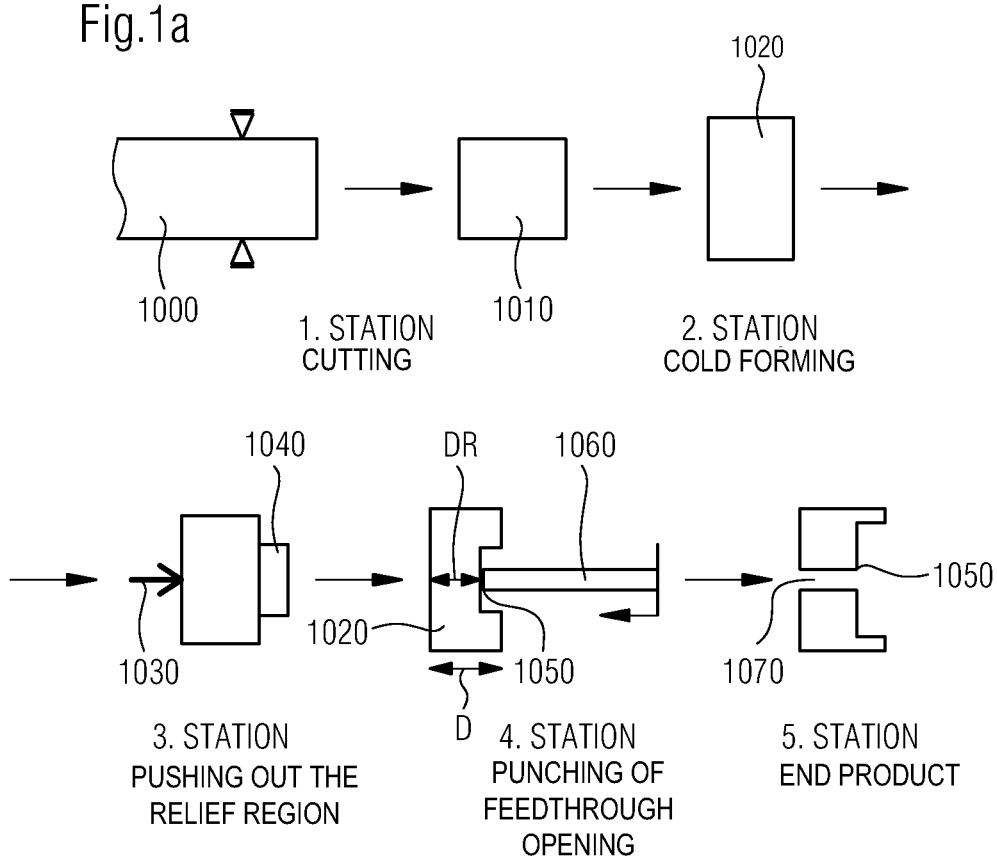
FIGS. 1a-1c show a method for the production of a ring-shaped or plate-like element according to the invention.

FIG. 1a illustrates the various stations of the production process. In the first station a blank 1010 is separated or respectively cut from a wire like material 1000. In the second step, that is in the second station to which the severed blank is transported in one production step, the blank is cold-formed by compressing to the point where the outside dimensions conform to the outside dimensions which the ring-shaped or plate-like element that is to be manufactured must have. The relative geometric dimensions are hereby altered, whereby the blank predominantly becomes wider due to compressing. In the following third station the cold-formed plate-like element 1020 is pressed against a punch 1040 with pressure 1030. Due to the pressure with which the ring-shaped or plate-like element is pressed against the punch, the material of the ring-shaped or plate-like element surrounds the punch. The material in the region of the punch is thereby removed from the plate-like element and the plate-like element with a relief opening or respectively relief region 1050 shown in the fourth station remains. The description of the sequence of process steps is merely exemplary. A relief opening in the blank could also be produced first, followed by subsequent reshaping.

Due to the relief bore thickness D of the plate-like element has been greatly reduced in region 1060 of the ring-shaped or plate-like element—that is to a thickness DR. The thickness of the ring-shaped or plate-like element is hereby reduced by between 20% and 60%, especially between 30% and 50%. Then, in a fifth process step a punching tool 1060 is inserted into the relief opening and a conical feedthrough opening 1070 is punched through the ring-shaped or plate-like element. Essentially, the ring-shaped or plate-like element with relief opening and feedthrough opening results as demonstrated in the fifth station. The inventive method distinguishes itself in that for each of the cited stations, that is for severing from the wire-like base material, forming, provision of the relief opening or respectively the relief region and punching of the feedthrough opening through the plate-like element with reduced thickness, essentially the same time is taken for each process step. This allows for the inventive method to be highly automated.

Figure 1B:
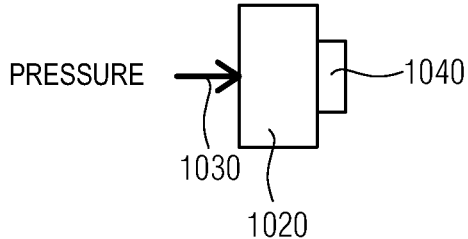
Figure 1C:
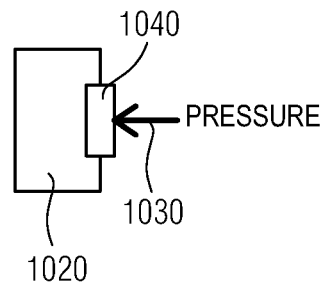

FIGS. 1b and 1c illustrate two methods which are possible in principle for providing the relief region or respectively the relief bore. In FIG. 1b, as in FIG. 1a the ring-shaped or plate-like element 1020 is pressed against a punch 1040 in the third step, so that the material surrounds the punch and from this a relief opening results. Alternatively it is possible, as shown in FIG. 1c, that not the plate-like base body 1020 is pressed against a punch 1040, but vice versa, punch 1040 is pressed against the ring-shaped or plate-like base body 1020. Then, due to the pressure on the side of the ring-shaped or plate-like body opposite the punch, the material is expelled. The result again is the ring-shaped or plate-like element with relief region or respectively relief bore.

Figure 2A:
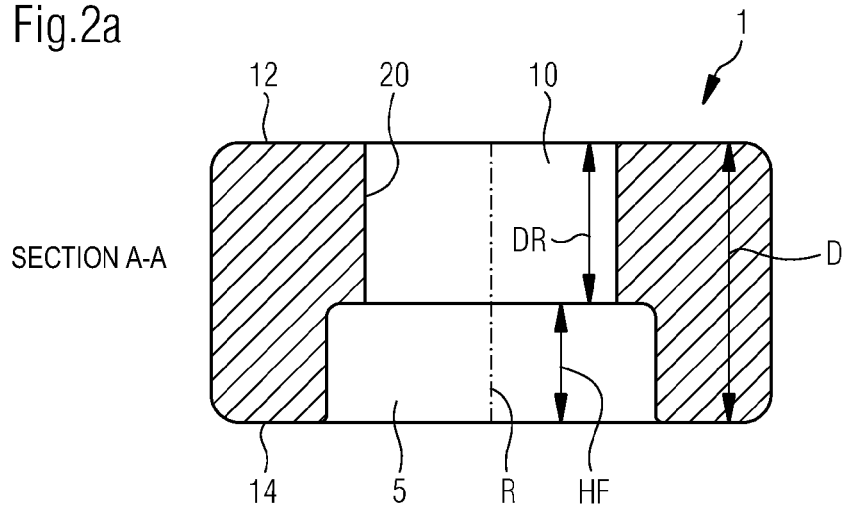
FIGS. 2a-2c show a ring-shaped or plate-like element according to the invention.
Figure 2B:
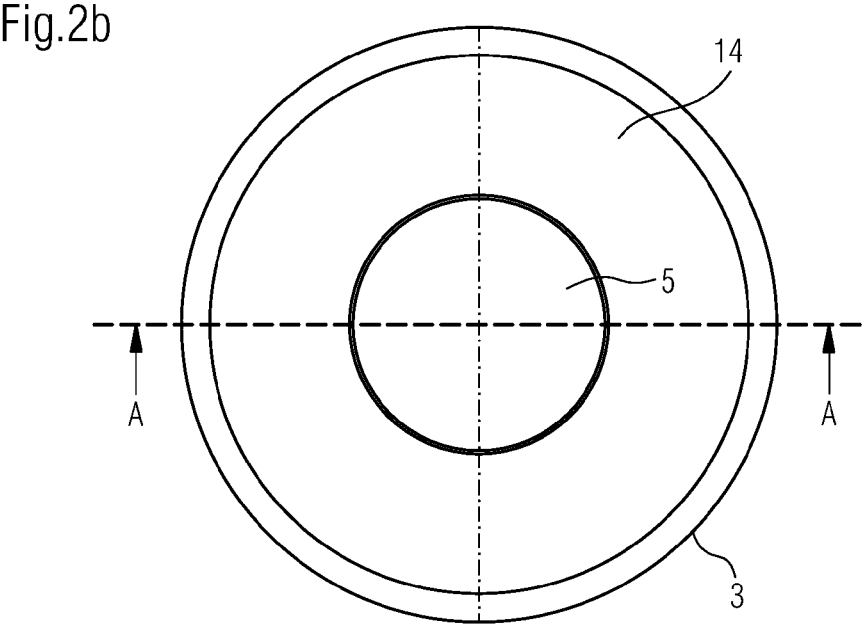
Figure 2C:
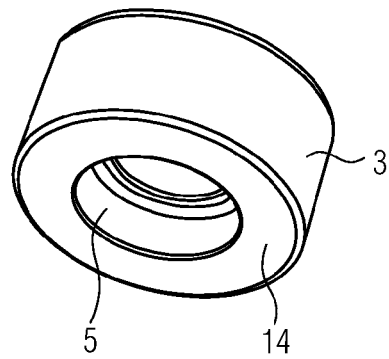

FIGS. 2a-2c illustrate a ring-shaped or plate-like formation or element, produced according to the inventive method which essentially is utilized as the base body for a metal-sealing material-feedthrough. As shown in a top view in FIG. 2b, the ring-shaped or plate-like element 1 has essentially a circular outer contour 3. Plate-like body 1 is produced preferably by a cold-forming process, as shown in FIG. 1a, for example from a wire. Hereby, a piece is first cut from the wire and is subsequently transformed through cold-forming, in particular through compression into the circular form illustrated in FIG. 2b in a top view from backside 14. FIG. 2c is a exploded view from backside 14.

Following this, a relief region 5 which is also referred to as relief bore is provided into the cold-formed component 1 by means of a punch.

The height or respectively thickness of the relief bore, which essentially circular as shown in the top view in FIG. 2b, equals HF.

The thickness of the entire ring-shaped or plate-like element which is obtained through cold-forming, equals D. The material therefore is weakened in the areas where the feedthrough opening is essentially placed central relative to the rotational axis R of the plate-like body, so that the solid material through which feedthrough opening 10 in the ring-shaped or plate-like element 1 must be punched equals merely DR. Thickness D of the plate-like element varies preferably between 3.5 mm to 6 mm and thickness DR of the region to be punched out between 1.5 mm and 3 mm. If plate-like element 1 is utilized in a metal-sealing material-feedthrough, then a metal pin in a sealing material, for example in a glass plug is inserted in the feedthrough opening. The glass plug is then in contact with the walls of the feedthrough opening. In order to avoid pushing the metal pin which was encased in a glass plug out of feedthrough opening 10, even at high pressures means are provided to prevent a relative movement from the front side 12 of ring-shaped or plate-like element 1 to the rear side 14. In the present design example this is achieved in that the feedthrough opening tapers conically over at least one region 20.

Figure 3A:
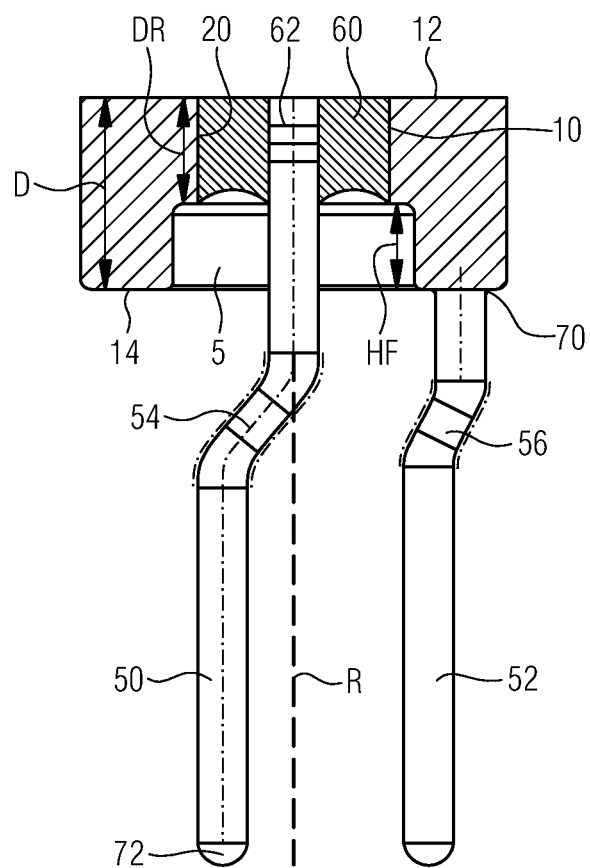
FIGS. 3a-3c show a metal-sealing material-feedthrough according to the invention.
Figure 3B:
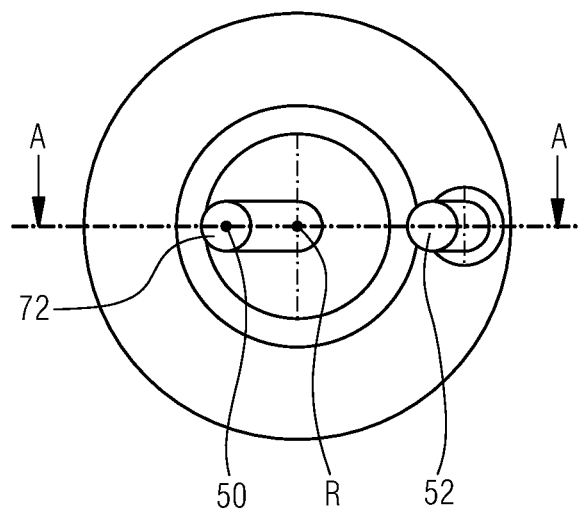
Figure 3C:
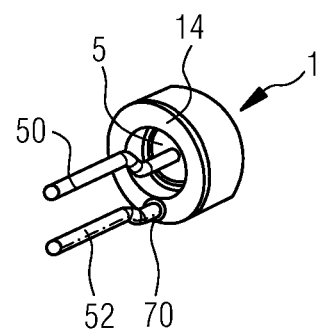

FIGS. 3a through 3c illustrate utilization of a plate-like element according to FIGS. 2a-2c according to the invention in a metal-sealing material-feedthrough, especially for airbag ignition devices, belt tensioning devices. Hereby FIG. 3a illustrates a section according to FIG. 2a, FIG. 3b a top view according to FIG. 2b and FIG. 3c an exploded view according to FIG. 2c.

Identical components as shown in FIGS. 2a through 2c carry the same identification numbers.

Ring-shaped or plate-like element 1 with a thickness D is clearly recognizable. Moreover, relief bore 5 is recognizable, which is punched out of the cold-formed plate-like element 1 by means of a punch. Above the punch, feedthrough opening 10 with its conical progression 20 which is punched from the remaining material with thickness DR can be seen.

The ring-shaped or plate-like element serves as the basis for a metal-sealing material-feedthrough with a total of two metal pins 50, 52. While metal pin 50 is fed through the ring-shaped or plate-like base body 1 from the front side to the rear side, insulated in a sealing material 60—in this case a glass material which however can also be glass ceramics or ceramic materials—second metal pin 52 serves as ground pin. For this purpose, second metal pin 52 is connected directly with ring-shaped or plate-like body 1. Metal pin 50 as well as metal pin 52 is curved. The curvature of both metal pins is identified with 54 and 56 respectively and is clearly recognizable.

Metal pin 50 is moreover provided with means 62 on metal pin 50 itself, which engage into the glass plug thereby preventing the metal pin being pushed out of glass plug 60 into which the metal pin is glazed, even at high pressures.

Glazing of metal pin 50 into sealing material 10 occurs through sealing in. As soon as the metal pin is fused into the sealing material the glass plug is inserted into the feedthrough opening 10 together with the metal pin. Then, the glass plug, together with the ring-shaped or plate-like element, that is the base body, is heated so that after cooling the metal of the ring-shaped or plate-like element shrinks onto the sealing material, in this case the glass material, as previously in the production of the glass plug whereby the metal pin is inserted into the glass plug. The grounded metal pin 52 is connected conductively with the ring-shaped or plate-like element, for example through brazing. The welding location is identified with 70.

FIG. 3*b* is a top view of an inventive metal-sealing material-feedthrough. Clearly seen in the top view is the central feedthrough 10 in the ring-shaped or plate-like element 1. Moreover, curved metal pin 50 and 52 respectively is clearly recognizable. Especially on metal pin 50 it can be clearly seen that the metal pin is offset, that is bent at its end 72 relative to center R of the plate-like base body. This also applies to metal pin 52. The curved pins are also clearly visible in the view in FIG. 3*c*. The illustration in FIG. 3*c* of the entire metal-sealing material-feedthrough shows in particular also the welding region 70 of the grounded pin as well as the relief bore or respectively the relief region 5 in the ring-shaped or plate-like base body. It is characteristic for a metal-sealing material-feedthrough with a plate-like element as base body according to the invention which has a relief bore or respectively a relief region that the embedding in glass 20 of the metal pin in the base body occurs only over a partial region, namely only over the thickness DR of the feedthrough opening and not over the entire thickness D of the base body.

FIG. 4*a* is a metallurgical section through a ring-shaped or plate-like element 1 produced through the inventive forming and punching process, as illustrated in FIG. 2*a*.

Identical components as shown in FIG. 2*a* carry the same identification numbers.

As can be seen from the metallurgic section according to FIG. 4*a*, the ring-shaped or plate-like elements 1 produced according to the inventive method are identified through structure-/flow-lines 1500 which were bent in region 1600 due to the forming process.

In contrast to this, FIG. 4*b* illustrates a component 100 produced in accordance with the conventional method by means of machining, which is in particular a turned part. Shown again are the structure-/flow lines 2000. Structure-/flow lines 2000 are essentially parallel and point into the same direction as the bar stock from which the ring-shaped or respectively plate-like component 100 was produced according to the state of the art, as shown in FIG. 4*b*. Feedthrough opening 110 is bored out of component 100.

The invention cites a method for the first time with which a plate-like element is to be produced in a simple manner and distinguishes itself through compatibility with the metal-sealing material-feedthrough according to the state of the art, thus enabling installation in conventional ignition devices or respectively airbags.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method to produce a cylindrical metal-sealing material-feedthrough, said method comprising the steps of:
producing a cylindrical plate-like body by providing a blank;
processing said blank so that a feedthrough-opening is incorporated into a ring-shaped or plate-like element created from said blank, said feedthrough-opening extending from a back side of said blank to a front side of said blank, said processing step including forming a relief region in said blank extending from said back side toward said front side using a cold forming process, the relief region having a height HF, the step of forming the relief region defining a reduced thickness region DR, said reduced thickness region DR having a thickness being not greater than 3 mm;
punching through the reduced thickness region DR to form the feedthrough-opening;
producing a sealing material including at least one metal pin embedded in said sealing material; and
inserting said sealing material with said at least one metal pin into said feedthrough-opening extending from said back side to said front side of said ring-shaped or plate-like element.

2. The method to produce a metal-sealing material-feedthrough of claim 1, wherein said blank is cold formed from a cylindrical wire-shaped material.

3. The method to produce a metal-sealing material-feedthrough of claim 2, wherein said cold-forming process includes compression.

4. The method to produce a metal-sealing material-feedthrough of claim 3, wherein said compression takes place along a longitudinal axis of said blank formed from a wire-shaped material.

5. The method to produce a metal-sealing material-feedthrough of claim 2, wherein said ring-shaped or plate-like element has an essentially round outside contour and said feedthrough-opening is located in a center of said ring-shaped or plate-like element.

6. The method to produce a metal-sealing material-feedthrough of claim 2, wherein, to incorporate said relief region, one of said ring-shaped or plate-like element is pressed against a punch and a material of one of said ring-shaped or plate-like element flows around said punch.

7. The method to produce a metal-sealing material-feedthrough of claim 6, wherein an essentially conically tapering feedthrough-opening is punched through said reduced thickness region DR.

8. The method to produce a metal-sealing material-feedthrough of claim 2, wherein cold forming said blank, providing said relief region, and punching said feedthrough opening occur in an essentially equal amount of time.

9. The method to produce a metal-sealing material-feedthrough of claim 2, wherein, to incorporate said relief region, a punch is pressed against one side of and one of said ring-shaped or plate-like element and a material of and one of said ring-shaped or plate-like element is pushed out on a side opposite said side of said ring-shaped or plate-like element.

10. The method to produce a metal-sealing material-feedthrough of claim 1, wherein said method further includes heating said ring-shaped or plate-like element and said sealing material, as well as subsequent cooling, so that a connecting bond is formed between said ring-shaped or plate-like element and said sealing material.

11. A method to produce a cylindrical metal-sealing material-feedthrough, said method comprising the steps of:
- producing a cylindrical plate-like body by providing a blank;
- processing said blank so that a feedthrough-opening is incorporated into a ring-shaped or plate-like element created from said blank, said feedthrough-opening extending from a back side of said blank to a front side of said blank, said processing step including forming a relief region in said blank extending from said back side toward said front side using a punch, the relief region having a height HF, the step of forming the relief region defining a reduced thickness region DR, said reduced thickness region DR having a thickness being not greater than 3 mm;
- punching through the reduced thickness region DR to form the feedthrough-opening;
- producing a sealing material including at least one metal pin embedded in said sealing material; and
- inserting said sealing material with said at least one metal pin into said feedthrough-opening extending from said back side to said front side of said ring-shaped or plate-like element.

12. The method of claim 11, wherein the processing step includes:
- forming the relief region in said blank by pressing the ring-shaped or plate-like element against the punch; or
- forming the relief region in said blank by pressing the punch against the ring-shaped or plate-like element.

\* \* \* \* \*